United States Patent [19]

Schneider

[11] Patent Number: 4,872,471

[45] Date of Patent: Oct. 10, 1989

[54] SEPARABLE AND BREAKAWAY VALVE INTERCONNECTING A FLUID LINE

[76] Inventor: Peter J. Schneider, 2480 Calle Narciso, Thousand Oaks, Calif. 91360

[21] Appl. No.: 247,205

[22] Filed: Sep. 21, 1988

[51] Int. Cl.$^4$ .............................................. F16L 29/00
[52] U.S. Cl. .......................................... 137/68.1; 285/2
[58] Field of Search ............................ 137/68.1; 285/2

[56] References Cited

U.S. PATENT DOCUMENTS

| 310,490 | 1/1885 | Atwood et al. | |
|---|---|---|---|
| 841,095 | 1/1907 | Osborne. | |
| 2,048,387 | 7/1936 | Johnsen. | |
| 2,800,912 | 7/1957 | McCamish et al. | 137/68.1 |
| 3,273,578 | 9/1966 | Clark. | |
| 4,098,438 | 7/1978 | Taylor | 137/68.1 X |
| 4,119,111 | 10/1978 | Allread | 137/68.1 |
| 4,134,416 | 1/1979 | Lallement et al. | |
| 4,307,744 | 12/1981 | Marrison. | |
| 4,449,545 | 5/1984 | Vernor. | |
| 4,483,359 | 11/1984 | Robertson. | |
| 4,638,975 | 1/1987 | Iuchi et al. | 251/149.6 |
| 4,762,140 | 8/1988 | Davis | 137/68.1 X |

FOREIGN PATENT DOCUMENTS

3122000 12/1982 Fed. Rep. of Germany .......... 285/2

Primary Examiner—Gerald A. Michalsky
Attorney, Agent, or Firm—Jessup, Beecher & Slehofer

[57] ABSTRACT

A breakaway coupler is fabricated as a cylinder with a flow through bore for interconnecting the end of a fluid line to a tank. A frangible groove is radially cut into the exterior wall of the cylinder midway between the ends. A plastic seal tube having a diameter less than the bore of the cylinder but longer than the cylinder is slideably positioned in the bore. There is a ring at one end of the seal tube and larger than the bore for maintaining the tube stationary within the cylinder. The other end of the seal tube extends from the other end of the cylinder and has flow through ports for allowing fluid flow through the coupler. This port end is also capped off. The frangible groove can fracture, causing the coupler to break into two sections and separate from one another. During the separation process, the section with the ring projection will pull away with the seal tube attached to it. This pulling away causes the capped end of the seal tube to enter the bore at the other end of the coupler and seal off the axial bore and prevent fluid leakage from the tank. The continued pulling away of the breakaway section causes the seal tube to also break at the cutaway flow through ports. The capped end of the seal tube remains sealed in the axial bore of the stationary section while the other half of the seal tube remains with the breakaway section.

24 Claims, 4 Drawing Sheets

SEPARABLE AND BREAKAWAY VALVE INTERCONNECTING A FLUID LINE

BACKGROUND OF THE INVENTION

1. Field of the Invention

Fluid handling processes involving a destructible or deformable element control; including a frangible element which retains pressure in response to a closed valve.

2. Description of the Prior Art

Safety relief and closure valves are well know in the art. For example, a pressure relief valve on a steam boiler or a hot water heater is preset so that once the interior reaches a threshold dangerous pressure, the valve will open releasing the pressure buildup, preventing further buildup and allowing the pressure to be relieved. Check valves are also well known in the art wherein the valve permits a one way flow so that there cannot be a reverse flow of the fluid that is being transported in the plumbing or tubing. Shut-off valves are also known in the art wherein there is a diaphragm, or a spring loaded diaphragm which remains open so long as there is pressure exerted on the diaphragm by the fluid flow moving through the valve body itself. When the fluid flow slows or is stopped resulting in reduced pressure, then the spring tensioned diaphragm will automatically close the valve. Couplings are also well known in the art. Copper tubing interconnected by flare nuts with threaded nipples having flared ends on the ends of the tubing provides a compression fit for sealing and preventing the leaking of fluid flow in the tubing.

In the typical automobile there is a gasoline fuel tank mounted in the rearward section of the vehicle and there are fuel lines connecting the fuel tank with the carburetor or fuel injection system of the engine. Additionally, an auto has a hydraulic braking system wherein there is a fluid reservoir and master cylinder which is actuated by the brake pedal, which in turn generates fluid pressure at each of the slave or brake cylinders connected to each one of the wheel brakes. The slave cylinders and the master cylinder are interconnected by means of hydraulic lines which are typically fabricated from metal tubing of some type.

Additionally, in racing circles, where drivers operate dragsters, formula cars, and other types of racing vehicles, the the fuel tanks are double walled and made of flexible material to minimize rupturing in the event of collision or upset by the vehicle. In airplanes, for safety reasons and because of weight distribution, the fuel supply tanks are usually formed in separate cells, placed in the wings and interconnected to one another by fluid lines. In the event of a collision or upset by a racing type of vehicle or the crashing of an airplane, the rupturing of the fuel tanks is always a grave concern for safety reasons, because the fuel leaking from the ruptured tanks can quickly ignite because of the hot exhaust valves and electrical circuitry thereby engulfing the entire vehicle in flames. Unfortunately, with these types fuel tanks, the coupling connection between the terminus of the fuel line and the fuel tank is a weak point in all of these designs. In the event of upset, collision, or crashing, the fuel line often times will break, or the end the fuel line and fuel tank connection will separate from the fuel tank creating an opening which will allow the fuel to escape. Various devices have been invented such as a shut-off valve or coupling in the event of a separation between the end of the fuel tank. Such devices are disclosed in Marrison's U.S. Pat. No. 4,307,744 and Clark's U.S. Pat. No. 3,273,578. They disclose safety valves for interconnecting a series of fuel cells as usually placed in the wings of an aircraft. The series of installed valves are identical and are placed between adjoining cells and are interconnected by flexible conduits. In the event of sufficient collision, the conduits will break causing the valves to automatically shut off almost instantaneously to minimize any fluid leakage and thereby to minimize the danger of fire. Of course in the event of a severe impact, the fuel cells will more than likely burst or split open anyway.

The prior art valves are designed so that when the fuel lines separate from the fuel tank, the fluid cannot escape or leak out from the fuel tank, or at least minimize fluid leakage from the tank. Unfortunately, most of the safety shut- off valves known in the art are not always effective in sealing off a fuel tank and frequently when there are lateral shearing forces hitting the sides of the tank and the fuel line, the shut off valves do not function properly, because they are sheared away rather than pulled apart.

SUMMARY AND OPERATION OF THE INVENTION

A coupler connecting a fluid line to a fluid holding tank is fabricated as a cylinder with a flowthrough axial bore and having threads on the exterior wall for threadably interconnecting the end of the fluid line with the tank. A frangible groove is radially cut into the exterior wall of the cylinder midway between the ends. A plastic seal tube having a diameter less than the bore of the cylinder but longer than the cylinder is slideably positioned in the bore. There is a ring projection at one end of the seal tube and larger than the diameter of the bore for maintaining the tube stationary with the cylinder. The end of the seal tube opposite the ring projection and extending from the other end of the cylinder includes flow through ports for allowing fluid flow through the coupler. This port end is also capped off. If the coupler is hit hard enough, the frangible groove will fracture, causing the coupler to break into two sections and separate one another. During the separation process, the section with the ring projection will pull away with the seal tube attached to it. This pulling away causes the capped end of the seal tube to enter the bore at the other end of the coupler and seal off the axial bore and prevent fluid leakage from the tank. The continued pulling away of the breakaway section caused by the force of the collision causes the seal tube to also break into two sections at its weakest point at the cutaway flowthrough ports. The capped end of the seal tube remains sealed in the axial bore of the stationary section while the other half of the seal tube and breakaway section of the coupler remain threadably attached to the end of the fluid line, which has previously separated from the other half of the valve.

The present invention is designed to function in the event of an accident to seal off and interrupt the flow of fuel, water, hydraulic fluid, air, caustic or acid solutions, which are contained in a container of some type or are piped through a system. The present invention is designed to interrupt and stop the flow of the solutions in the event of a shearing force to the coupling wherever it is connected to the container or piping system. In a common application, the coupling will interconnect the end of the fuel line connecting the fuel tank where the other end of the fuel line connects with the engine. The coupling is intended to be separable so that it will fracture and break apart in the event of being hit severely which can commonly happen in a collision or other upset. Often times, in a collision or upset, the fuel line will be pulled away from the fuel tank, because of the separation of the fuel tank, or the fuel line being broken away and being forced away from the fuel tank which does not separate. In either event, the fuel line will break some where because of the pulling forces applied to it. In the usual course of events it will result in the breaking away of the coupling at the fuel tank. When the coupling breaks, then the contents of the fuel tank will spew all over creating a great risk of fire to the driver or occupants of the airplane or other vehicle.

Additionally, in other applications sprinkler head systems are installed as a fire deterrent in office buildings. The sprinkler systems have heads which extend downwardly from the ceiling of the building and normally are interconnected by piping so that if one sprinkler head starts to leak there is no way to turn off that particular sprinkler head. Oftentimes maintenance people or other authorized personnel in a building will be moving a ladder or moving boxes such as in moving the fork lifts. As a result, these objects which are moving near the ceiling will occasionally clip off a sprinkler head causing the pressurized water to flow into the area damaging the merchandise or other equipment in that particular area of the building. The only way to turn off the water is to go to the main valve which oftentimes is hard to find by the person who clipped the sprinkler head. During the interim until the main water shut off valve is turned off the water escapes under high pressure and can result in severe damage to the building or its contents. The present invention could be installed between the water pipe and the sprinkler head such that should the sprinkler head be clipped or otherwise sheared off by a fork lift or a ladder the coupling would automatically fracture, breakaway and seal the water to prevent it from leaking out.

In another application this breakaway valve system could be installed in the bulkhead or other areas in between the master cylinder and the braking system of an automobile and the brake lines going to the slave cylinders contained in each brake. Again in the event of collision or upset the coupling will fracture, separate and breakaway to seal off the hydraulic line to maintain pressure in the hydraulic system so that the automobile or other vehicle does not lose its braking power. This hydraulic breakaway valve could also find applications in other areas where hydraulic systems are quite often utilized. Again where the hydraulic lines are exposed and can be accidentally hit and sheared off this type of a valve could be installed between the bulkhead or a frame and the flexible brake line so that the valve would seal off any fluid leakage in the event of the brake line or the hydraulic line being sheared away. For example, in aircraft, most of the wing flaps to control the stability of an airplane are controlled by hydraulic devices. In the event of sudden shearing such as if an engine falls off or the propeller breaks apart and impacts an area adjacent to the rupture, the hydraulic lines going to the damaged area will be sealed off because of the shearing forces and the pulling away of the hydraulic lines. It is foreseeable that the hydraulic coupling as disclosed in this invention could be installed in a bank of several hydraulic couplings which would be fastened to part of the main frame and then several of the connecting hydraulic lines would be connected to this bank of hydraulic couplings. These banks of couplings would be positioned throughout the aircraft so that the breaking of one bank of hydraulic lines would minimize the loss of fluid to the remaining undamaged parts of the hydraulic system.

DETAILED DESCRIPTION OF THE PREFERRED EMBODIMENTS

Figure 1:
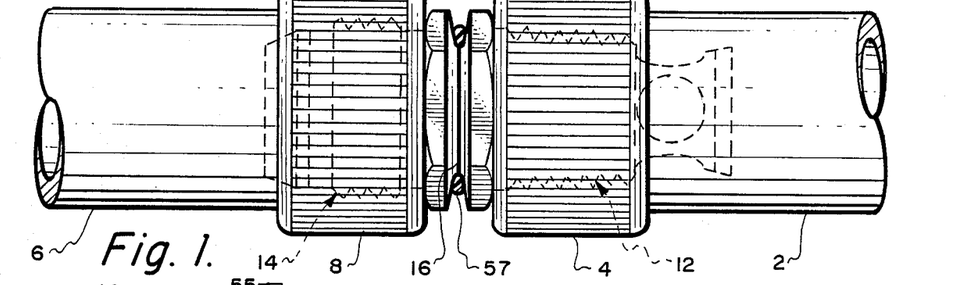
FIG. 1 shows the first embodiment of the valve in phantom lines interconnecting two fluid lines.

Referring now to FIG. 1 there is disclosed the first embodiment of the invention interconnecting the complementary ends of two fluid lines. The fluid line on the right side is labeled 2 having a threaded connector head 4, and it threadably connects with the stationary section of the valve. The other fluid line 6 also has a threaded connector 8 which is threadably connected to the breakaway section of the breakaway valve.

Figure 2:
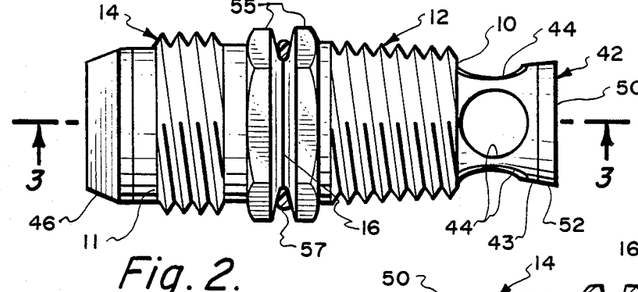
FIG. 2 illustrates the valve shown in phantom lines in FIG. 1 further illustrating the head of the plastic seal tube extending from one end.

FIG. 2 clearly illustrates the side view of the valve or coupler, without the pair of interconnecting fluid lines attached thereto. The valve is generally defined as having a threaded stationary section 12 and a threaded breakaway section 14. Where the two sections 12 and 14 merge, there is a V-shaped groove cut into the outer cylindrical wall of the valve forming what is termed a frangible groove 16. The stationary section 12, the breakaway section 14 and the frangible groove 16 form the coupler portion of the valve. They are axially aligned with one another and are generally defined as forming a hollow cylindrical coupler. There is a bore 18 throughout the first and second sections for allowing the insertion of what is termed a plastic seal tube 40. The bore has a first opening 10 and an opposite second opening 11. Both ends of the seal tube are shown in FIG. 2.

Figure 3:
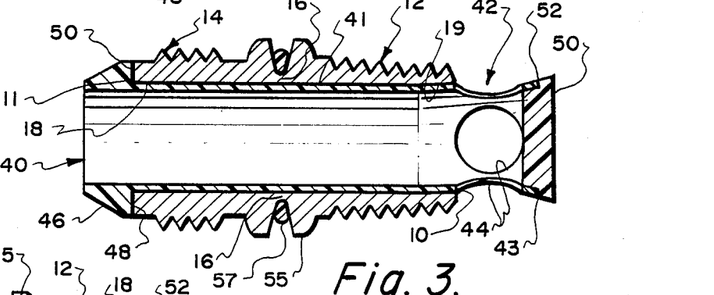
FIG. 3 is a longitudinal cross-sectional view taken along the lines 3—3 of FIG. 2.

FIG. 3 is a longitudinal cross-sectional view taken along the lines 3—3 of FIG. 2 clearly illustrating the relationship between the plastic seal tube 40 and the axial bore 18.

The plastic seal tube 40 is defined as having a hollow tube 41 with a sealing means 42 at the first end and a cylindrical or a circular stop means 46 at the other, or second end. Inboard from the sealing end are positioned at least one and usually four side ports 44 drilled in the wall of the hollow tube 41. When in the installed open or flow-through position in the breakaway valve, the plastic seal tube 40 is normally in the open position as shown in FIGS. 1, 2, or 3. The stop means 46 fits flush with the end of the breakaway section 14. The sealing end 42 and side ports 44 extend through the axial bore and beyond the end face of the stationary section. The flow through capability of the plastic seal tube 40 is readily apparent in FIG. 3. When the seal tube is in its normal operating position, the flow of liquids or gaseous fluids is unimpaired because the fluid can flow through the side ports and into the hollow tube and out the other end of the seal tube. Additionally, the shoulder 48 of the beveled ring 46 attached to the second end of the seal tube is pressed against the face end 50 of the breakaway section by means of the threaded connection 8 of fluid line 6 as shown in FIG. 1. The flared interior portion of the threaded connection of the fluid line forces the beveled ring 46 against the face end 50 and maintains the hollow tube stationary in the axial bore 18 of the coupler.

The second major component of this embodiment, which has been briefly described, is the plastic seal tube 40. The plastic seal tube includes a hollow tube 41. The plastic seal tube also has towards its first end a sealing means illustrated as a capped plug 42, and a stop means illustrated as a beveled ring 46 at its other, or second end. The main body of the plastic seal tube slideably fits within the axial bore 18 of the coupler, or valve. The sealing means 42 extends beyond the first opening 10 of the axial bore at the stationary section. The hollow tube has at least one, and preferably several side ports 44 drilled into the hollow tube adjacent the capped plug 50. The purpose of the side ports is to allow fluid flow from the first fluid line into the hollow tube and out through the opening in the beveled ring 46, and on through the second fluid connection. In normal operation, this is the way the fluid will flow between the two fluid connections. The sealing means 42, which includes the area of the tube near the side ports, has a cap 50 secured to the open end of the hollow tube. The plug is slightly tapered so that it normally cannot pass through the entire bore 18 of the coupler. When the valve is fabricated, the cap 50 is separate from and is not connected to the first end of the plastic seal tube until after the tube is positioned in the axial bore of the coupler. The tapered plug area of the hollow tube extending beyond the end of the axial bore then allows for the cap to be secured to the open end of the tube by an appropriate adhesive.

The seal tube 40 includes a hollow tube 41 longer than the overall length of the coupler, a stop means 46 at its second end, and a sealing means 42 towards its first end which extends beyond the opening of the bore in the stationary section 12. The stop means is illustrated as a circular ring larger than the diameter of the bore and beveled at the outer edge of its circumference. The sealing means 42 is illustrated as a flared extension of the hollow tube with flow through ports 44 cut away in the hollow tube for allowing passage of the fluid when the coupler is in its normal operating position. The complementary 3 degree taperings of the bore, the extension and the plug allow for a nice tight seal when the extension is pulled into the bore in the event of a collision and the disengagement of the stationary and breakaway sections. In an alternate version, the extension, or sealing means, the bore and the plug would not have any tapering. The body of the plug 50 could have a diameter slightly larger than the inside diameter of the hollow tube. The body of the plug could be forced into the first end of the plastic seal tube and glued to it during the fabrication process. In the event that the plug end is pulled into the bore, the overall diameter of the extension would be slightly larger than the bore, but would still allow entry of the extension into the bore. The plug could have a flanged rim to prevent the plug from entering the ore beyond the rim. In either event, the pulling of the extension and plug into the bore will eventually cause the hollow tube to break adjacent to the ports, because this is the weakest area of the plastic seal tube. It could also be possible to have a frangible groove cut into the wall of the hollow tube to form the weakest spot in the seal tube. In this case, the tube would break and separate at the frangible groove rather than at the port area. There could also be an intentional weakness in the wall by modifying the thickness of a portion of the wall of the hollow tube as in a circumferential indentation.

The bore 18 towards its first opening 10 at the outer end of the first coupler has a slight outward tapering 19 which is about 3 degrees. Likewise, the extension of the hollow tube has a slight outward tapering 43 of about 3 degrees. The tapered plug 50 is inserted in the end of the plastic seal tube during the fabrication process and will not disengage from the end at anytime. The tapered plug has a tapered rim 52 which circumference abuts the end of the hollow tube and forms a continuum of the sealing means with the 3 degree outward taper.

The applications of this invention have been previously discussed in the SUMMARY. One environment in which this breakaway valve could be located would typically be in connecting two fuel lines in a race car, dragster or some other type of competition vehicle. Additionally, the valve could be used as a coupling between the gasoline line and the gasoline tank. The gasoline line would normally be a very strong steel braided construction which would be there to feed gasoline or other fuels from the fuel tank to the engine. In some competition type race cars, the fuel tank is double walled for safety purposes to prevent it from bursting or splitting apart in a collision. The threaded opening into the fuel tank would be used to mate with the stationary section 12 of the coupler. The breakaway section 14 of the coupler would then be connected to the braided fuel line 6. In this embodiment, both breakaway and stationary sections of the coupler are threaded on the outside for threadably connecting with fuel lines or tanks. The integrated hex nut or nuts 55 formed between the two sections would be used to tighten the valve with the fuel line or tank of the race car.

Safety is always paramount in race cars because of the danger of fire whenever there is a collision or upset. The fuel line can break and spray gasoline or other fuels around the driver who is usually strapped into place and cannot readily extricate himself from the vehicle in the event of a fire. One purpose of this invention is to seal off the gasoline tank so that its fuel contents will not spill out from the fuel tank.

The purpose of the frangible groove 16 cut into the exterior of the coupler is to create a weak point in the breakaway valve. In a typical collision, the fuel line could break, pull away or the valve itself could be hit sideways causing a shearing force to the exposed breakaway section and fuel line. In these situations, the frangible groove is intended to allow the metal in that area to fracture and allow the two sections to separate. As the breakaway section separates from the stationary section, the first end 42 of the plastic seal tube 40 will be pulled into the end of the axial bore 18 in the stationary section of the coupler. This occurs because the shoulder 48 around the beveled ring-shaped end 46 of the tube 40 riding against the face 50 of the breakaway section prevents the hollow tube 41 from remaining in the axial bore 18. As the hollow tube and beveled end, which comprise the main body of the plastic seal tube, are being pulled away with the separating fuel line, the tapered plug area 42 of the seal tube is pulled into the opening of the axial bore until the rim 52 of the cap 50 prevents it from entering any further. As the fluid line continues to pull away, there has to be a give somewhere and that occurs in the weak area of the hollow tube, or stem which is the side port area. Since most of the hollow tube has been removed in the area where the side ports 44 have been drilled, there are only four narrow bridges which connect the tube, or stem to the capped plug end of the tube. These bridges will easily tear thereby allowing the remainder of the seal tube to separate and break away along with the fluid line. The tapered capped plug 50 and capped end 42 will be snugly positioned in the opening and axial bore of the breakaway section thereby precluding any fluid leakage from the fuel tank. The capped end opening of the axial bore 18 of the stationary section can be tapered towards the outside opening, at roughly about a three degree angle. This allows the tapered plug area and cap to form an extremely tight seal between the two. Additionally, the capped plug end 42 itself can have a three degree outward taper on its outer circumference. The capped plug 42 would then have the appearance of a frusto-conical cross-section.

Figure 4:
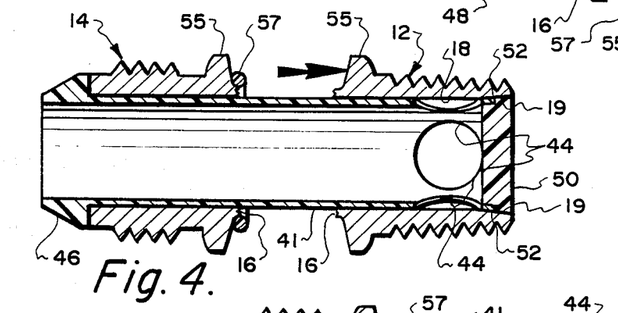
FIG. 4 shows the intermediate step when the two halves of the valve fracture and separate at the frangible groove.
Figure 5:
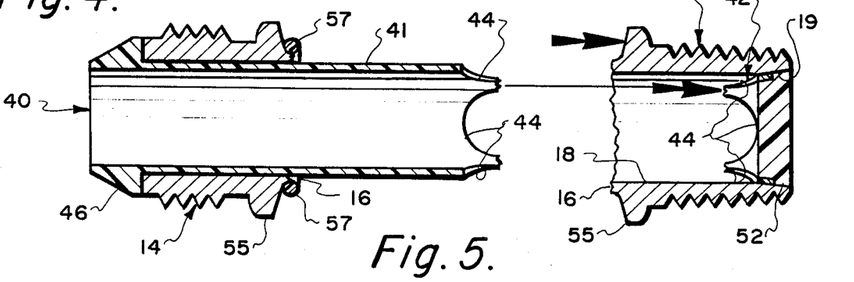
FIG. 5 illustrates the final and succeeding step after FIG. 4 wherein the separation is complete. The detached plug end of the plastic seal tube has sealed off the stationary section of the valve while the other breakaway section and main portion of the seal tube have completely separated as a unit.

The sequence of separation and sealing are illustrated in FIGS. 4 and 5 of the drawings. Of course, in the actual working environment of this valve, the fracturing and breaking of the frangible groove 16 and the sealing of the capped end 42/50 in the axial bore 18 would take place in a few hundredths of a second. Even though the sequence of separation shown in FIGS. 4 and 5 indicates the succession of steps which would take place in the event of an outward pulling away of the fuel line, if the exposed breakaway section and fuel line are hit at acute angles from the axial bore, the frangible groove 16 still separates in the predicted manner. The flexible plastic seal tube 40 is pliable enough to be bent at acute angles to the axial bore of the valve and still be pulled into the axial bore of the stationary section and allowing the capped-off port end 42/50 to seal off the stationary portion end of the axial bore.

There can be an O-ring 57 positioned in the frangible groove 16 to provide a certain amount of protection from gouging and the like when the valve is in position and also to prevent any slight leakage in the frangible groove should it develop a slight crack. The O-ring is also important in dampening the considerable amount of vibrations inherent in a typical vehicle in which the valve has been installed.

Figure 6:
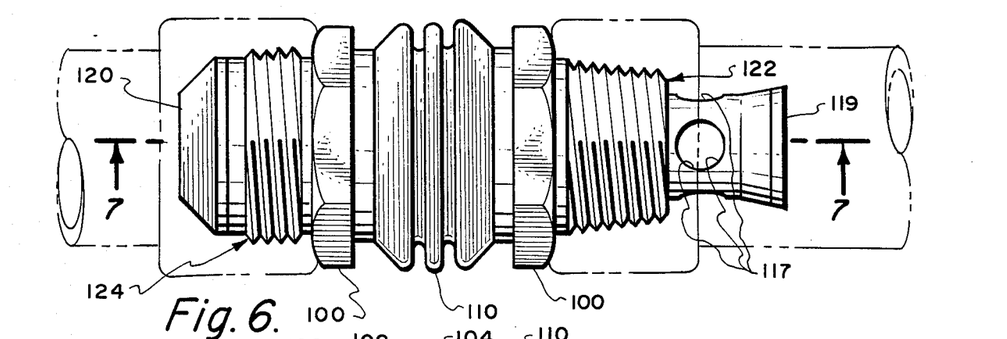
FIG. 6 illustrates a second alternative embodiment of the separable valve further illustrating an elastic bellows sealing off the frangible groove area and illustrating the two connecting fluid lines in phantom.
Figure 7:
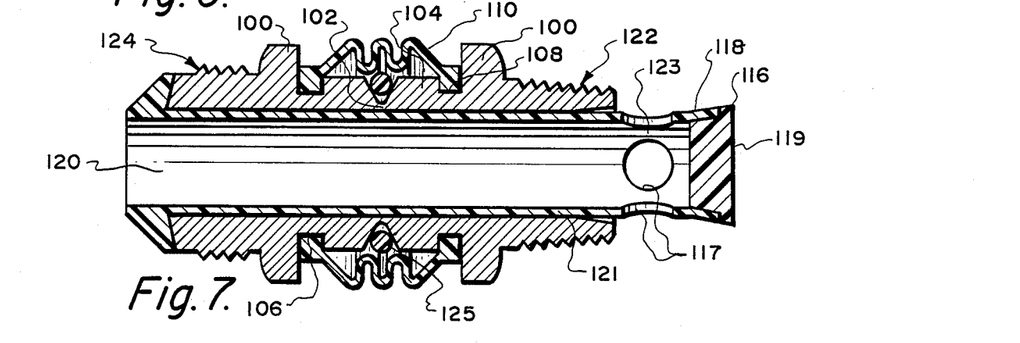
FIG. 7 is a longitudinal cross-sectional view taken along the lines 7—7 of FIG. 6.

FIGS. 6 through 9 show an alternative embodiment to the embodiment shown in FIGS. 1 through 5. In this second embodiment the integral hex nuts 100 are more widely separated and the frangible groove 102 is part of a central cylindrical portion of the valve. This area of the valve has been stretched out. As can be seen in FIG. 7, this central cylindrical portion 104 has the V-shaped frangible groove 102 machined away to create the weakest point in this valve. Additionally, on either side of this frangible groove is also machined two circular recesses 106 and 108. The purpose of these two circular recesses is to provide a space and a bonding area for the elastomeric bellows 110 which is slipped over one end of the valve and positioned into place as shown in FIGS. 6 and 7. The ends of the bellows are bonded into these circular recesses.

FIG. 6 is similar to FIG. 1 illustrating the environment in which the second alternative embodiment of the invention would most likely be installed. There is disclosed the body of the breakaway valve and the plastic seal tube 120 in its normal operating position. The body of the valve is again a coupler having a stationary section 122 and a breakaway section 124 defined by means of the V-shaped frangible groove 102 which is machined into the outer surface of the cylindrical portion 104 of the coupler.

It is to be understood throughout this specification that the terms breakaway and stationary are used for descriptive purposes only. The terms could be used interchangeably to describe either section, because either section is capable of breaking and pulling away from the other section. The coupler will separate and seal either way. However, the section which is sealed off with the capped end of the seal tube is arbitrarily labelled the stationary section, and the part of the coupler which retains the main body of the seal tube is arbitrarily labelled the breakaway section.

On either side of the frangible groove 102 are recesses 106 and 108 adjacent to the integral hex nuts 100. On either side of the hex nuts are the threaded connections. Accordingly, the breakaway section 124 includes the threaded connection, the integrated hex nut 100, the circular recess 106 and one side of the V-shaped frangible groove 102. The stationary section also has these corresponding elements.

The additional features of this alternate embodiment include the pair of circular recesses 106 and 108 used as anchoring points for the elastomeric flexible bellows 110 which is slipped over one end of the valve and put into position as shown in FIG. 6 and FIG. 7. The circular ends 107 of this bellows are bonded in the pair of circular recesses to provide a nice, leakproof seal. The purpose of this bellows is keep the exterior central portion of the cylinder clean and to prevent fuel leakage from the frangible groove in the event of a slight crack in the frangible groove. The expandable bellows also tends to minimize fuel leakage in the event the valve is broken away because of upset or collision. In the rapid sequence of events wherein the frangible groove fractures and the first or stationary 122 and second or breakaway 124 sections of the coupler disengage, the bellows as shown in FIG. 8 will retain the small amount of fuel leaking through the plastic seal tube 120.

Figure 8:
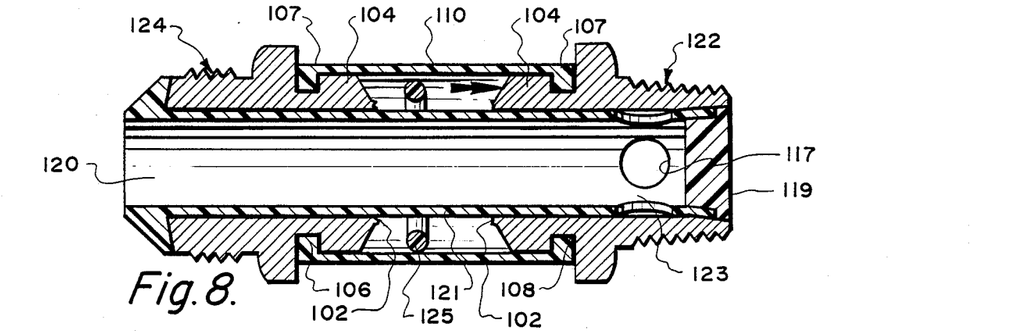
FIG. 8 shows the first stage in the fracturing process where the two sections of the coupler separate pulling the capped end of the seal tube into first opening of the bore.
Figure 9:
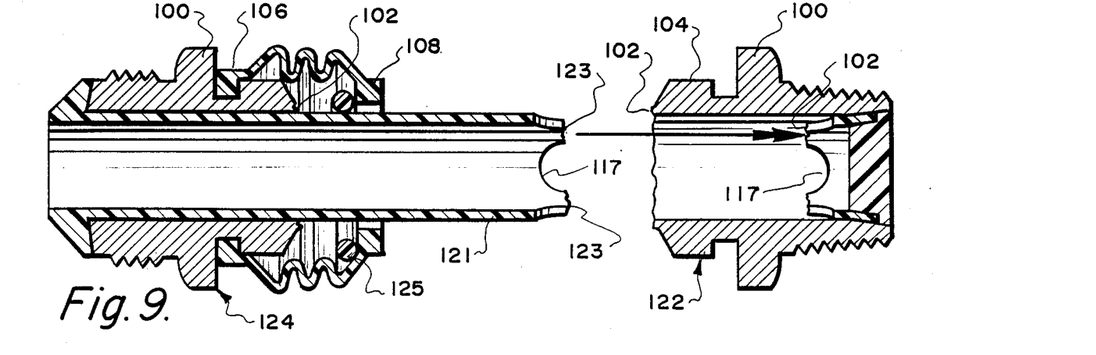
FIG. 9 shows the second stage of the separation process wherein the capped end of the plastic seal tube becomes sealed into the first opening of the bore at the stationary section while the main body of the plastic seal tube separates from its capped end allowing the two sections of the coupling to completely disengage.

FIGS. 8 and FIG. 9 illustrate the sequence of events which take place when the frangible groove 102 fractures as a result of a pulling away of the fuel line from the other fuel line or tank. The plastic seal tube 120 is the same structure as that of FIG. 3 although the hollow tube is longer because of the longer axial bore passing through the coupler. The plastic seal tube includes the hollow tube which extends through and beyond the end of the axial bore of the coupler. The seal tube has a beveled ring 116 at its second end which keeps the plastic seal tube stationary into the axial bore when the nut on the end of the fluid line is pressing against this beveled ring. At the other end is the exposed tapered end 118 extending from the bore, and a capped end 119. There are four side ports 117 drilled into the first or capped end area of the hollow tube. The tapered end area 118 is conically shaped having about a three degree outward taper. The cap 119 which is forced into the first end of the hollow tube 121 has a rim 116 which, when positioned into the open end of the first end of the hollow tube, provides a flush surface with the end of the tapered area. This tapering allows for a tight fit when the hollow tube is pulled into the end of the axial bore as the two sections are separating. Again, the weakest spot in the hollow tube 121 is the wall area 123 where the bridges adjacent the side ports will tear apart at this point leaving the capped end in position as shown in FIG. 9. There is an O-ring 125 which is the same diameter as the frangible groove and is positioned in the frangible groove. The O-ring is intended to minimize vibrations in the coupling. Vibrations emanate from the engine or other components near where the coupling would normally be installed.

Figure 10:
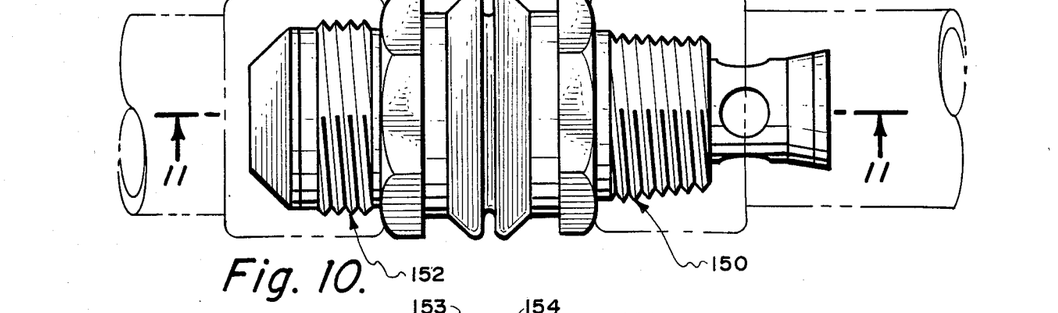
FIG. 10 shows a third alternative embodiment of the invention illustrating the valve interconnecting opposing fluid lines shown in phantom lines.
Figure 11:
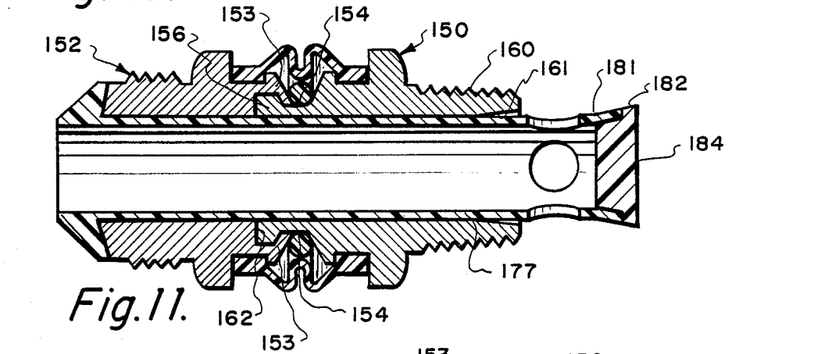
FIG. 11 is a longitudinal axial cross-sectional view taken along the lines 11—11 of FIG. 10 further illustrating the crimped seal which holds the two distinct sections, or couplers together.
Figure 12:
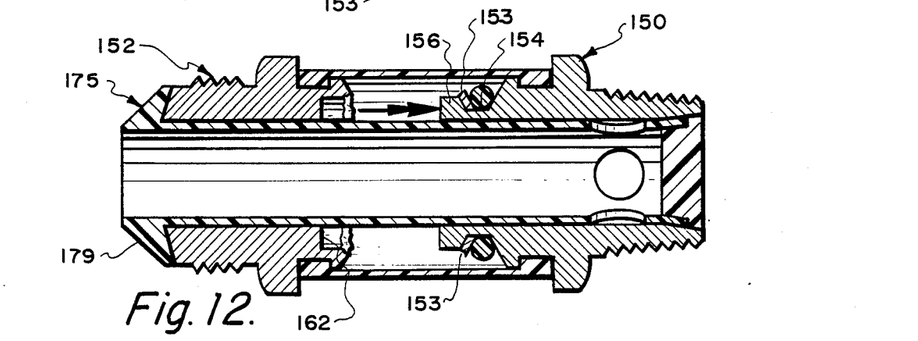
FIG. 12 shows the first stage in the separation process where the crimped flange breaks away from the first coupler, or section and the capped end of the plastic seal tube seals off the bore of the first coupler, or section.
Figure 13:
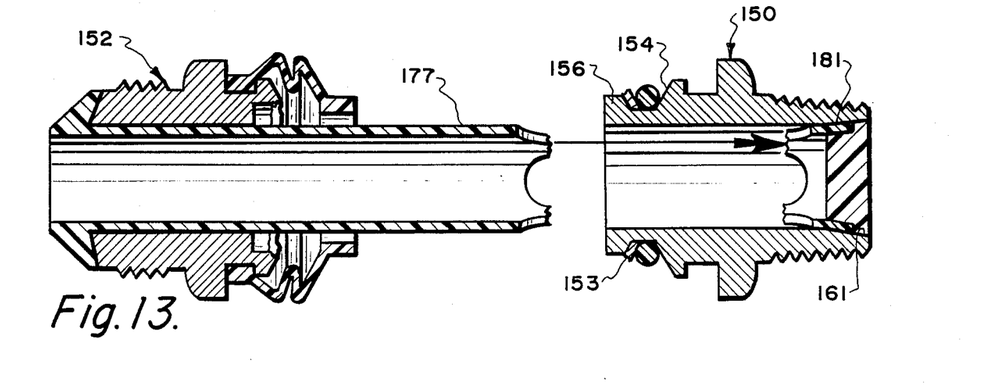
FIG. 13 shows the second step of the separation process wherein the capped end of the plastic seal tube is sealed in the bore of the first coupler, the main body of the seal tube has separated from its capped end and the two halves are completely separated from one another.

FIGS. 10 through 13 illustrate yet a third embodiment of the invention wherein the elastic bellows is also present. However, the body of the valve which forms the couplers is actually fabricated from two separate pieces 150 and 152 The two separate pieces mate together and there is a bendable metal flange 153 which is bent around forming a crimped seal. This crimped seal fractures and allows the two sections to separate. There is no frangible groove in this third embodiment of the invention. FIG. 10 is similar to FIGS. 1 and 6 wherein the breakaway valve is shown in a typical environment interconnecting two fluid lines such as two fuel or gaseous lines. There is the stationary section 150 forming the first connector and the breakaway section 152 forming the second connector. The first connector 150 has an annular groove 153 forming an annular flange 156 on the end of the connector opposite that of the threaded end 160. Similarly, the second connector 152 has a circular annular seat 162 cut into itself adjacent to the opening of the axial bore. The bendable annular seam 153 extends beyond the rim of this annular seat 162. The two connectors are combined by having the annular flange 156 mate with the annular seat 162 and then the bendable seam 154 is bent over the annular flange to form a crimped seal. Whenever the coupler, or valve is involved in a collision on the vehicle it is installed on, the valve separates by means of having this crimped seal formed by the bendable annular seam 154 and the annular flange 156 fracture around its circumference as shown in FIG. 12. The crimped seal will remain with the annular flange 156 while the first coupler 152 is pulled away along with the plastic seal tube 175 as shown in FIG. 12. The plastic seal tube 175 in this embodiment has the same configuration as that shown in FIGS. 6 through 9 in the second embodiment and the discussion regarding that seal tube applies to this third embodiment.

The seal tube includes a hollow tube 177 longer than the overall length of the coupler, a stop means 179 at its second end, and a sealing means 181 towards its first end which extends beyond the opening of the bore in the first coupler 150. The stop means is illustrated as a circular ring larger than the diameter of the bore and beveled at the outer edge of its circumference. The sealing means is illustrated as a flared extension of the hollow tube with flow through ports cut away in the hollow tube for allowing passage of the fluid when the coupler is in its normal operating position. The complementary 3 degree taperings of the bore, the extension and the plug allow for a nice tight seal when the extension is pulled into the bore in the event of a collision and the disengagement of the first and second coupler. In an alternate version, the extension, or sealing means, the bore and the plug would not have any tapering. The body of the plug could have a diameter slightly larger than the inside diameter of the hollow tube. The body of the plug could be forced into the first end of the plastic seal tube and glued to it during the fabrication process. If and when the plug end is pulled into the bore, the overall diameter of the extension would be slightly larger than the bore, but would still allow entry of the extension into the bore. The plug could have a flanged rim to prevent the plug from entering the bore beyond the rim. In either event, the pulling of the extension and plug into the bore will eventually cause the hollow tube to break adjacent to the ports, because this is the weakest area of the plastic seal tube. It could also be possible to have a frangible groove cut into the wall of the hollow tube to form the weakest spot in the seal tube. In this case, the tube would break and separate at the frangible groove rather than at the port area. There could be a weakness in the wall by modifying the thickness of a portion of the wall of the hollow tube as in a circumferential indentation.

The bore towards the opening at the outer end of the first coupler has a slight outward tapering 161 which is about 3 degrees Likewise, the extension of the hollow tube has a slight outward tapering 182 of about 3 degrees. The tapered plug 184 is inserted in the end during the fabrication process and will not disengage from the end at anytime. The tapered plug has a tapered rim which circumference abuts the end of the hollow tube and forms a continuum of the sealing means with the 3 degree outward taper. Additionally, the elastomeric flexible bellows is likewise bonded into place by having its respective ends secured to the circular recesses adjacent to the two hex nuts. The purpose of the bellows is to prevent fuel leakage in the event that the crimped seal becomes slightly cracked. Where the two parts are separating as in FIG. 12, the bellows, of course, will spread out to and eventually tear away from the stationary coupler. The O-ring is shown to also act as a barrier to minimize leakage around this crimped seal, and to act as a dampener to minimize the extensive vibration in the coupler.

Referring now to FIGS. 14-17 there is disclosed the application of the basic invention to a hydraulic line connection. Hydraulic lines are extensively used in all types of vehicles to actuate brake calipers for stopping the moving vehicle, to transfer hydraulic fluid or pressure to another hydraulic cylinder and the like. In any environment in which a hydraulic system is used, there must be interconnecting fluid cables or lines between two hydraulic cylinders. In a typical situation, for example in an automobile, there will be the master brake cylinder attached to the fire wall and having the brake pedal and a plunger connected to the master brake cylinder. This brake cylinder in turn has connecting tubing to the four hydraulic wheel cylinders on each of the four wheels for actuating the brake drums or brake calipers to stop the vehicle. In the event that one of these tubing, commonly referred to as a brake line, becomes severed through accident, upset or normal wear and tear, then the hydraulic fluid can leak out and the hydraulic pressure is lost in the system thereby resulting in a loss of braking power on the vehicle. The purpose of the coupling illustrated in FIG. 14-17 is to provide for a controlled breaking point between a rigid housing frame mount and a movable brake line so that in the event of collision, accident or upset, the brake line will pull away and cause the coupling to close and seal off the hydraulic line at the interconnection at the coupling.

Figure 14:
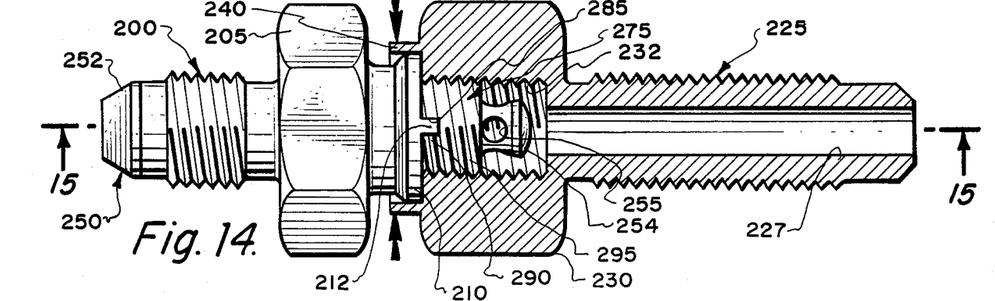
FIG. 14 is a partial cutaway plan view of the valve used in a hydraulic brake line system.
Figure 15:
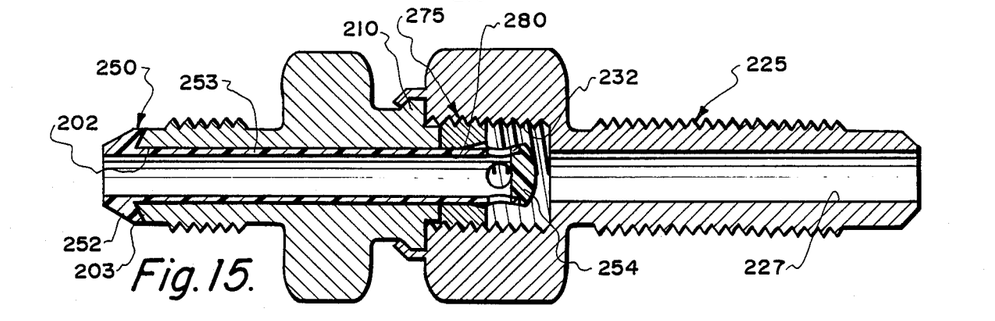
FIG. 15 is a longitudinal axial view taken along the lines 15—15 of FIG. 14.
Figure 16:
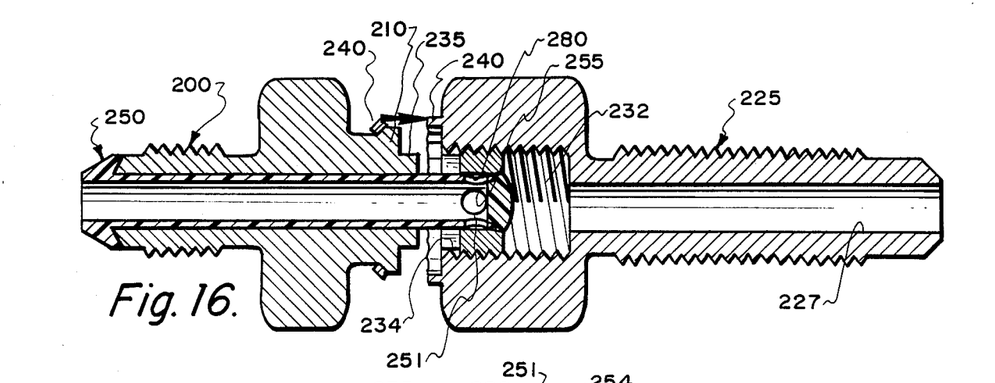
FIG. 16 is a longitudinal axial view of the valve showing the first sequence in the separation of the two couplings when caused by collision, upset or impact of the vehicle in which this valve has been installed.

In this version of the invention, there are four main components: (1) the second threaded nipple 200 having an integral hex nut 205 and an annular flange 210; (2) a first extended threaded nipple 225 having an integrated hex nut 230 and an annular seat means 234 and a crimping means 240; (3) a plastic seal tube 250; and (4) a slotted threaded valve seat 275. The first threaded nipple 225 and integral hex nut 230 can also be referred to as the stationary section, or first connector, of the coupler. The second threaded nipple 200 and integral hex nut can also be referred to as the second coupler first half, or breakaway section, of the coupler. There is the threaded valve seat 275 which is threadably inserted into the threaded chamber 232 within the circular opening 234 of the integral hex nut of the stationary section. This valve seat has an axial bore 280 therethrough and a pair of slots 285 cut away in the face 290 of the seat. The outer circumference 295 of the valve seat is also threaded. The circumferential threads of the valve seat threadably mate with and are threadably inserted into the threaded chamber 232 of the stationary section 230 and 225. As previously stated, the stationary section has an axial bore 227 going therethrough. The bore, or threaded chamber 232, in the integral hex section 230 is larger than the other portion of the bore 227 and is also threaded for receiving the threaded valve seat 275. The breakaway section labelled 200 and 205 which also has an axial bore 202 throughout its entire length has a cone-shaped head 250 at the end of its threaded nipple 200. At the end opposite the cone head 203, there is an annular shoulder 210. Extending from this annular shoulder 210 is at least one and usually two lugs 212. The two lugs mate with the pair of slots 285 in the face 290 of the valve seat 275. Whenever the integral hex nut 205 of the breakaway section is turned, the valve seat 275 will likewise turn and be threaded into the threaded chamber 232 of the stationary section.

The face of the stationary section 230 and 227 around the opening of the threaded chamber 232 includes an annular flange 240 which is made of a material flexible enough so that it can be crimped. The annular shoulder 210 of the breakaway section matches up with and mates flush inside and with the annular flange 240 of the stationary section. The circular opening 234 and the concentric circular projection 235 extending from the inner face of the breakaway section also mate with one another for better alignment of the two sections. When the stationary and breakaway sections are flush with one another, the bendable flange 240 is crimped over the shoulder 210 to create a tight seal and completes the coupling between the breakaway and stationary sections. Before the two sections can be crimped together, the plastic seal tube 250 must first be inserted into the axial bore 202 of the breakaway section. The seal tube has the same type of construction as that shown in FIGS. 1-13 and is basically fabricated from the same type of material. There is the circular beveled ring 252 attached at the second end to the hollow tube 253 and there is a cap 254 inserted in the first, or capped-off port end 251 of the seal tube.

Towards the capped end, there are one or more ports 255 drilled into the wall of the hollow tube for allowing passage of the hydraulic fluid when the coupler is in the open position. As previously stated, the capped end 251 has a seal means which is normally a circular disk-shaped plug 254 having an enlarged beveled head which matches up with and mates with the first end of the seal tube. It is securely sealed to the first end so that the cap 254 will not separate from the first end. The seal tube 250 must be longer than the combined lengths of the axial bore 202 of the breakaway section and the axial bore 280 of the valve seat 275 in order to allow the ports 255 to be exposed beyond the valve seat when the coupling is in its operating mode.

The seal tube 250 is initially inserted into the axial bore 202 of the breakaway section and also through the axial bore of valve seat 275. Before this is done, however, the lugs 212 and slots 285 are lined up so that the valve seat 275 is flush against the annular shoulder 210 of the breakaway section. In this configuration, the port end of the tube is exposed so that it will be also exposed in the threaded chamber 232 of the stationary section. The cap 254 is then glued to, or otherwise inserted and secured into the capped end of the seal tube. The installation is then proceeded with by means of turning the integral hex nut 205 which causes the threaded valve seat 275 to screw into the threaded chamber 232 of the stationary section until the face of the annular shoulder lies flush and fully into the annular flange of the stationary section. Thereafter, the bendable metal flange 240 is crimped into place and the coupling is now in its finished and ready to be installed position in the vehicle.

Figure 17:
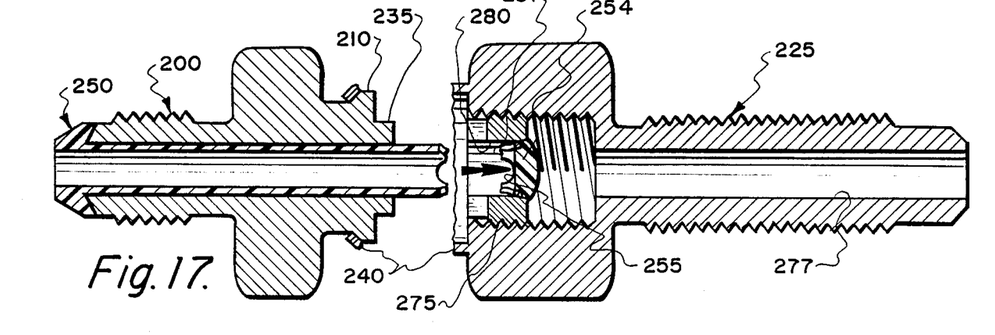
FIG. 17 is the second sequence of the breakaway process wherein the capped end fully seals off the brake line while the flexible brake line and breakaway section are allowed to breakaway.

The threaded nipple area 225 of the stationary section has an extensive threading area between the integral hex nut 230 and the cone shaped or beveled head at its end. This extensive threaded area will allow for the end to be inserted into a mounting hole in the vehicle and a locking nut could be threaded onto these threads to secure the stationary section to the frame or other mounting spot. Thereafter the connecting brake line which has a flared end and flare nut will be threadably connected to the beveled end of this threaded connection. The other end of the brake line likewise will probably have a flare nut and a flared ending so that it will mate nicely with the threaded nipple 200 of the breakaway section. Note that the beveled ring 252 of the plastic tube mimics the beveled end 203 of the underlying threaded connection that it overlies. The flare nut and flared end will press against the beveled ring 252 of the plastic seal tube thereby forcing and maintaining the seal tube 250 in its open position as shown in FIGS. 14 and 15. The valve will always operate in its open position unless the breakaway and stationary sections separate from one another as shown in the sequences in FIGS. 16 and 17. For illustration purposes, the breakaway section is being pulled away from the stationary section of the valve coupling. When this occurs, the hollow tube 253 is pulled or drawn into the axial bore 280 of the valve seat 275 causing the first, or capped end 251 to enter and seal off the axial bore in the valve seat. The capped end of the seal tube has about a three degree tapering. The diameter of this open area between the ports and the capped head is slightly larger than the diameter of the axial bore of the valve seat. The cap, or plug 254 prevents the capped end of the seal tube from passing through the axial bore of the valve seat. As a result the capped first end and cap remain plugged and sealed in the axial bore. As the breakaway section is being pulled away, something has to "give" in the hollow tube. This "giving" takes place at the bridges between the sides of the ports 255, because this is the area where there is the least amount of material in the seal tube and as a result is the weakest point. The main body of the hollow tube separates from the remainder of the capped end as shown in FIG. 17. During the separation process, the crimped joint between the annular shoulder 210 and the annular flange 240 will separate because the metal is bendable and will also shear away from the base of the stationary section.

Whereas the present invention has been shown and described herein in what is conceived to be the best mode contemplated, it is recognized that departures may be made therefrom within the scope of the invention which is therefore not to be limited to the details disclosed herein but is to be afforded the full scope of the invention.

What is claimed is:

1. A separable valve interconnecting a fluid line to another fluid line or tank for holding fluids comprising:
   a generally cylindrically shaped coupler having a stationary section and a breakaway section axially aligned with each other;
   said breakaway section and said stationary section defined by a frangible groove circumferentially positioned between said breakaway and stationary sections of said coupler;
   a generally axially positioned bore extending through said coupler and having a first and second opening at opposite ends of said coupler;
   a plastic seal tube having a first end and a second end and having a length in excess of the length of said axial bore of said coupler and slideably positioned in said bore;
   said plastic seal tube having a hollow tube means for allowing fluid passage;
   said plastic seal tube having a sealing means toward said first end;
   said plastic seal tube having a cap means inserted at said first end, said cap means and said sealing means forming a plug means for sealing off said bore of said coupler in the event of separation of said breakaway and said stationary sections of said coupler;
   said hollow tube of said plastic seal tube having at least one flow through port means towards said first end for allowing fluid to pass through;
   said plastic seal tube having stop means at its said second end for maintaining said hollow tube in said axial bore, and for maintaining said first end of said tube and said flow through port extending from said first opening of said axial bore when said valve is in its normal operating position;
   said frangible groove positioned between said sections of said coupler will fracture upon sufficient force applied to the separable valve causing said sections of said coupler to pull apart;
   said stop means at said second end of said plastic seal tube moving with said separating breakaway section of said coupler thereby pulling said first end of said seal tube into said axial bore at said first opening and sealing off said bore by preventing fluid escape through said bore;
   the continued pulling away of said stop means of said plastic seal tube and said breakaway section of said coupling resulting in strain on said hollow tube resulting in separation of said hollow tube from said first end near said flow through port thereby allowing complete separation of said breakaway and said stationary sections of said coupler.

2. The device as recited in claim 1 wherein said stop means includes a circular beveled ring.

3. The device as recited in claim 1 wherein said sealing means toward said first end of said plastic seal tube is tapered outwardly from said second end of said plastic seal tube.

4. The device as recited in claim 1 further comprising integral nut means on said coupler for allowing said coupler to be turned with a wrench.

5. The device as recited in claim 1 wherein said breakaway section and said stationary section of said coupler each has connector means on their exterior for connecting to a fluid line or tank.

6. The device as recited in claim 1 further comprising an elastomeric bellows means surrounding said frangible groove of said coupler for sealing off and preventing fluid leakage in the event of a crack in said frangible groove.

7. The device as recited in claim 1 further comprising an O-ring means positioned in said frangible groove for dampening vibrations.

8. The device as recited in claim 1 including said axial bore of said coupler being tapered towards its said first opening of said stationary section.

9. A separable valve interconnecting a fluid line to another fluid line or tank for holding fluids comprising:
   a generally cylindrically shaped breakaway coupler having a stationary section and a breakaway section axially aligned with and connected with each other;
   said breakaway section and said stationary section of said coupler comprising two separate connectors;
   said stationary section having an annular flange and groove at its inside end;
   said breakaway section having an annular seat in its inner end for receiving and mating with said annular flange of said stationary section;
   a bendable and fracturable outer annular seam means concentrically positioned around said annular seat of said breakaway section and crimped over said annular flange of said first section for sealing the joint between said annular flange and said annular seat;
   said circular seam having the capacity to fracture whenever sufficient force is applied to said breakaway section as the result of accident or upset thereby allowing said couplers to uncouple;
   a generally axially positioned bore extending through said coupler and having a first and second opening at opposite ends of said coupler;
   a plastic seal tube having a first end and a second end and having a length in excess of the length of said axial bore of said coupler and slideably positioned in said bore;
   said plastic seal tube having a hollow tube means for allowing fluid passage;
   said plastic seal tube having a sealing means toward said first end;
   said plastic seal tube having a cap means inserted at said first end, said cap means and said sealing means forming a plug means for sealing off said bore of said coupler in the event of separation of said breakaway and said stationary sections of said coupler;
   said hollow tube of said plastic seal tube having at least one flow through port means towards said first end for allowing fluid to pass through;
   said plastic seal tube having stop means at its said second end for maintaining said hollow tube in said axial bore, and for maintaining said first end of said tube and said flow through port extending from said first opening of said axial bore when said valve is in its normal operating position.

10. The device as recited in claim 9 wherein said crimped seal positioned between said sections of said coupler will fracture upon sufficient force applied to the separable valve causing said sections of said coupler to pull apart;
   said stop means at said second end of said plastic seal tube moving with said separating breakaway section of said coupler thereby pulling said first end of said seal tube into said axial bore at said first opening and sealing off said bore by preventing fluid escape through said bore;
   the continued pulling away of said stop means of said plastic seal tube and said breakaway section of said coupling resulting in strain on said hollow tube resulting in separation of said hollow tube from said first end near said flow through port thereby allowing complete separation of said breakaway and said stationary sections of said coupler.

11. The device as recited in claim 9 wherein said stop means includes a circular beveled ring.

12. The device as recited in claim 9 wherein said sealing means toward said first end of said plastic seal tube is tapered outwardly from said second end of said plastic seal tube.

13. The device as recited in claim 9 further comprising integral nut means on said coupler for allowing said coupler to be turned with a wrench.

14. The device as recited in claim 9 wherein said breakaway section and said stationary section of said coupler each has connector means on their exterior for connecting to a fluid line or tank.

15. The device as recited in claim 9 further comprising an elastomeric bellows means surrounding said crimped seal of said coupler for sealing off and preventing fluid leakage in the event of a crack in said frangible groove.

16. The device as recited in claim 9 further comprising an O-ring means positioned adjacent said crimped seal for dampening vibrations.

17. The device as recited in claim 9 including said axial bore of said coupler being tapered towards its said first opening of said stationary section.

18. A separable valve interconnecting a hydraulic line to another hydraulic line or tank for holding fluids comprising:
   a generally cylindrically shaped breakaway coupler having a stationary section and a breakaway section axially aligned with and connected with each other;
   said breakaway section and said stationary section of said coupler comprising two separate sections;
   said breakaway section having an annular shoulder at its inside end;
   said stationary section having an annular grooved seat in its inner end for receiving and mating with said annular shoulder of said breakaway section;
   a bendable and fracturable outer circular seam means concentrically positioned around said annular grooved seat and crimped over said annular shoulder flange of said breakaway section for sealing the joint between said annular shoulder and said circular groove;
   said circular seam having the capacity to fracture whenever sufficient force is applied to said breakaway section as the result of accident or upset thereby allowing said breakaway section and said stationary section to uncouple;
   a generally axially positioned bore extending through said coupler and having a first and second opening at opposite ends of said coupler;
   an enlarged threaded chamber forming the inside end of said bore of said stationary section;
   a threaded valve seat threadably positioned in said threaded chamber and further having an axial bore for receiving a plastic seal tube;
   slot and lug means for connecting said valve seat to said annular shoulder for allowing both to rotate in unison;
   a plastic seal tube having a first end and a second end and having a length in excess of the length of said axial bore of said breakaway section and said axial bore of said valve seat and slideably positioned in said bores;
   said plastic seal tube having a hollow tube means for allowing fluid passage;

said plastic seal tube having a sealing means toward said first end;

said plastic seal tube having a cap means inserted at said first end, said cap means and said sealing means forming a plug means for sealing off said bore of said valve seat in the event of separation of said breakaway and said stationary sections of said coupler;

said hollow tube means of said plastic seal tube having at least one flow through port means towards said first end for allowing fluid to pass through;

said plastic seal tube having stop means at its said second end for maintaining said hollow tube in said axial bores, and for maintaining said first end of said tube and said flow through port extending from said axial bore of said valve seat when said valve is in its normal operating position.

19. The device as recited in claim 18 wherein said crimped seal means positioned between said first and second sections of said coupler will fracture upon sufficient force applied to the separable valve causing said sections of said coupler to pull apart;

said stop means at said second end of said plastic seal tube moving with said separating breakaway section of said coupler thereby pulling said first end of said seal tube into said axial bore of said valve seat and sealing off said threaded chamber of said stationary section by preventing fluid escape through said chamber;

the continued pulling away of said stop means of said plastic seal tube and said breakaway section of said coupling resulting in strain on said hollow tube resulting in separation of said hollow tube from said first end near said flow through port thereby allowing complete separation of said breakaway and said stationary sections of said coupler.

20. The device as recited in claim 18 wherein said stop means includes a circular beveled ring.

21. The device as recited in claim 18 wherein said sealing means toward said first end of said plastic seal tube is tapered outwardly from said second end of said plastic seal tube.

22. The device as recited in claim 18 further comprising integral nut means on said coupler for allowing said coupler to be turned with a wrench.

23. The device as recited in claim 18 wherein said breakaway section and said stationary section of said coupler each has connector means on their exterior for connecting to a fluid line or tank.

24. The device as recited in claim 18 including said axial bore of said valve seat being tapered towards its said first opening of said stationary section.

* * * * *